UNITED STATES PATENT OFFICE.

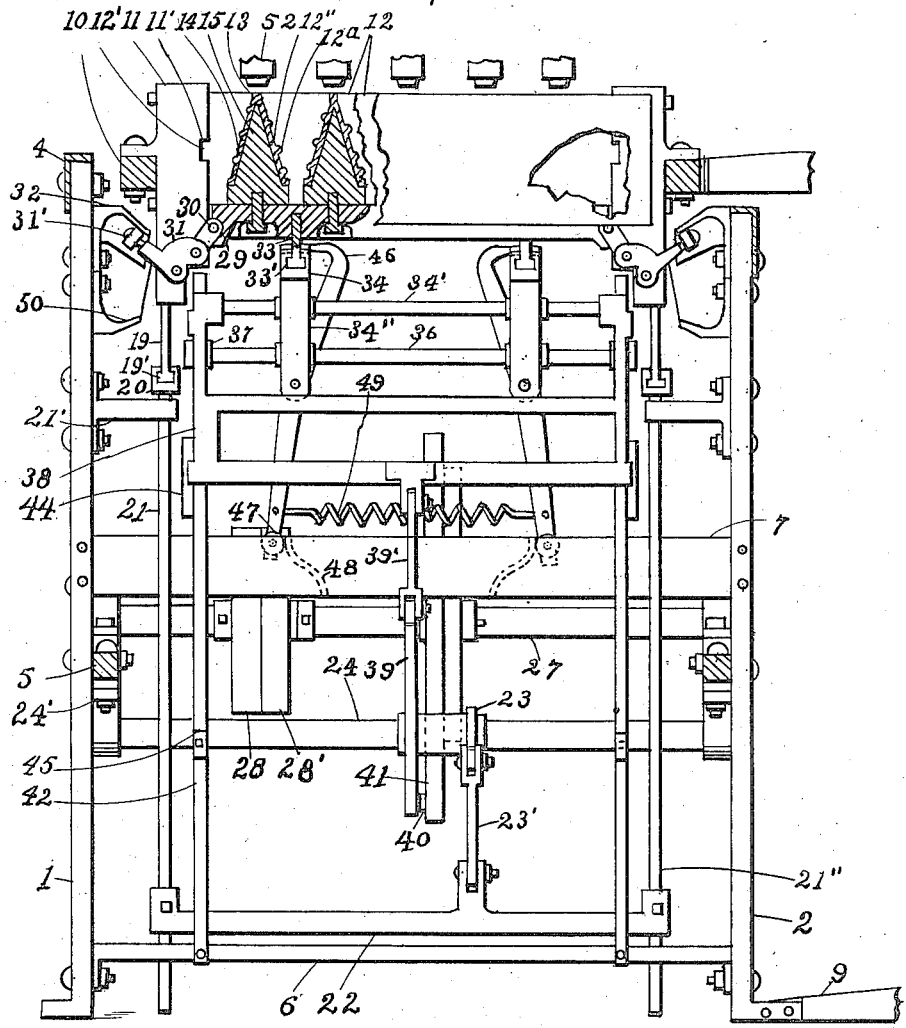

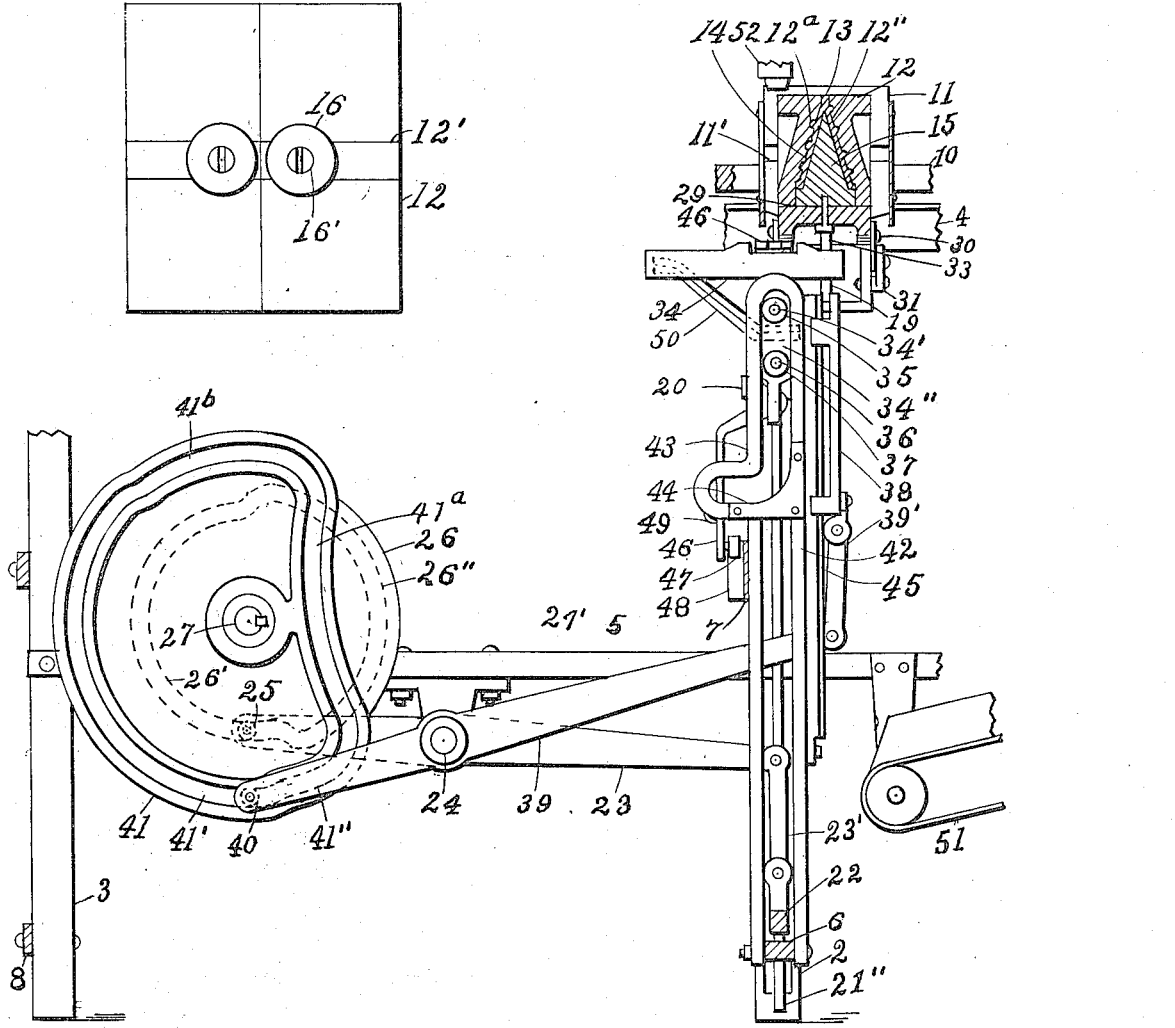

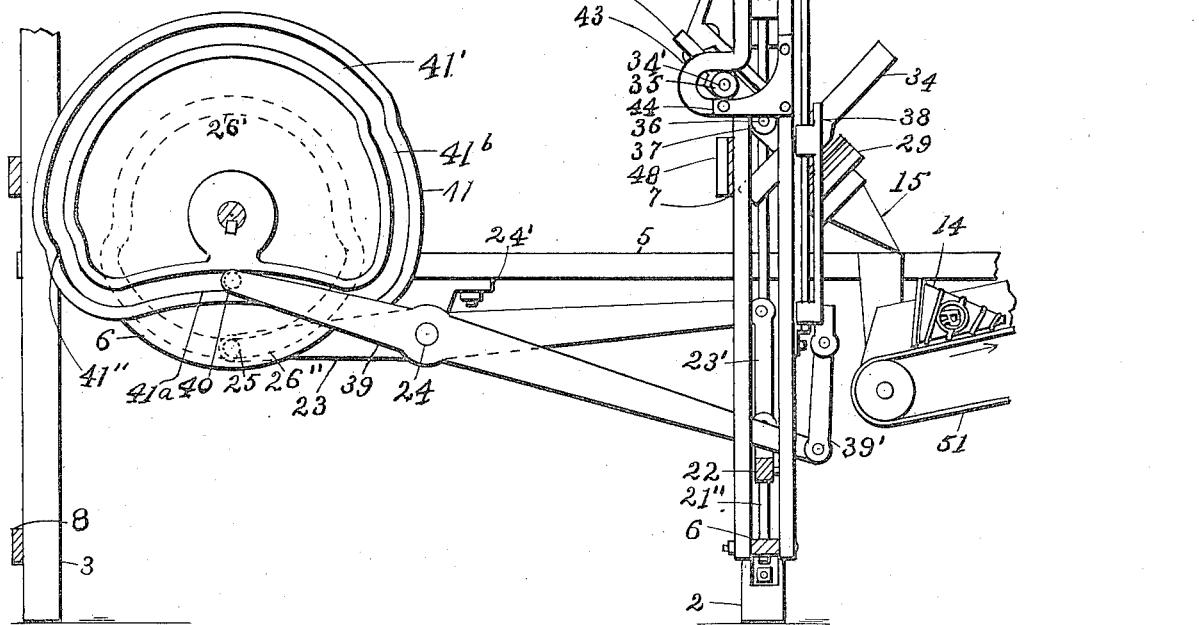

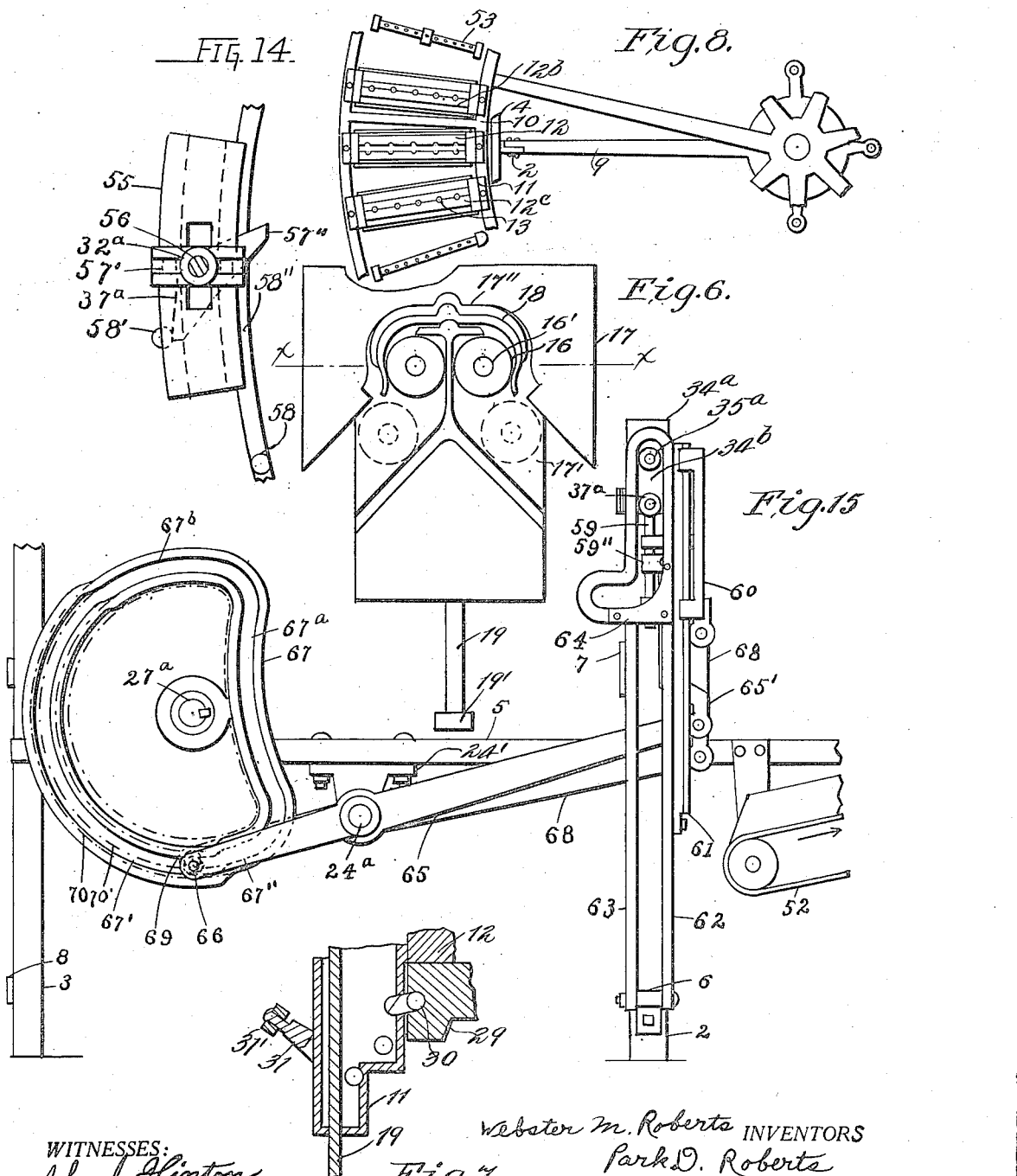

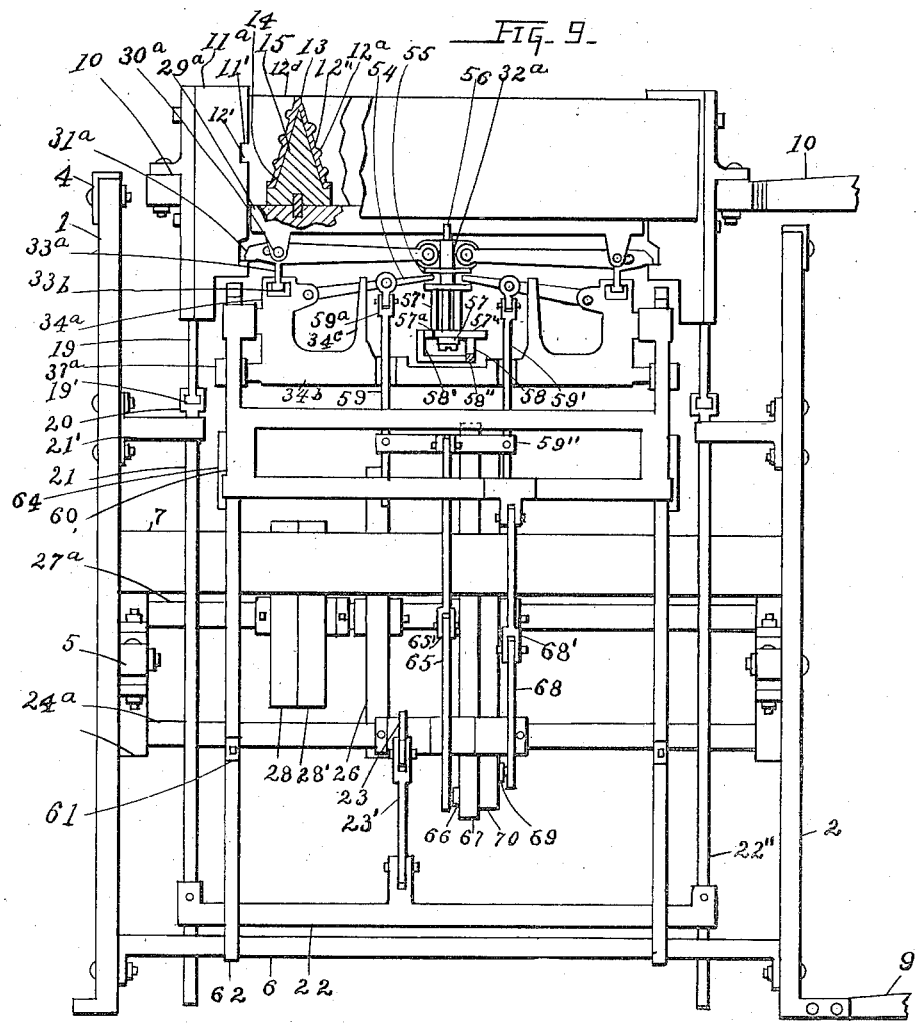

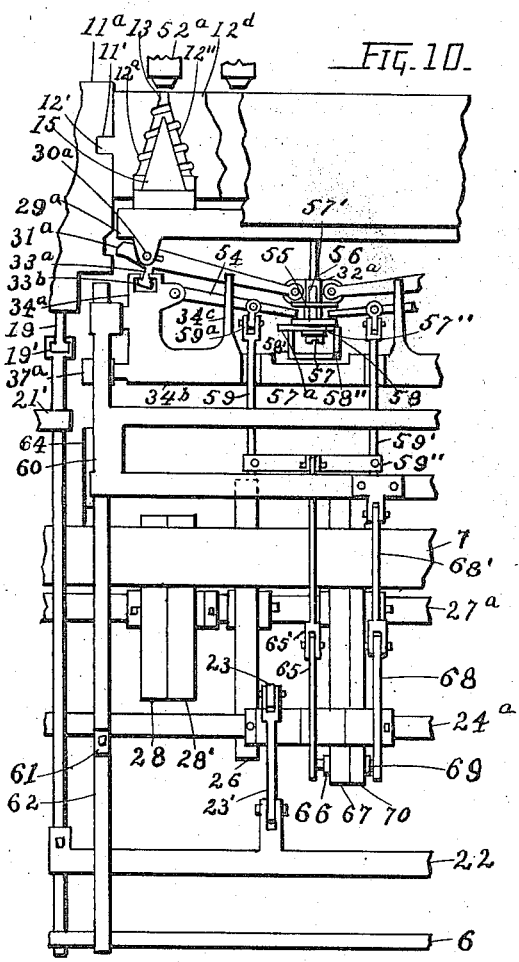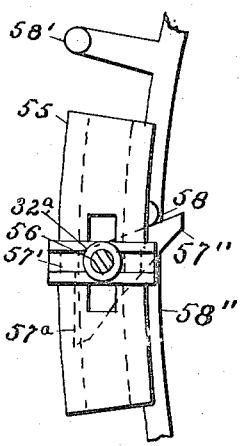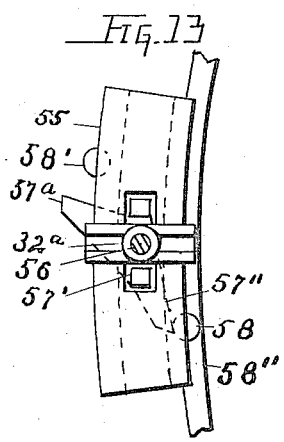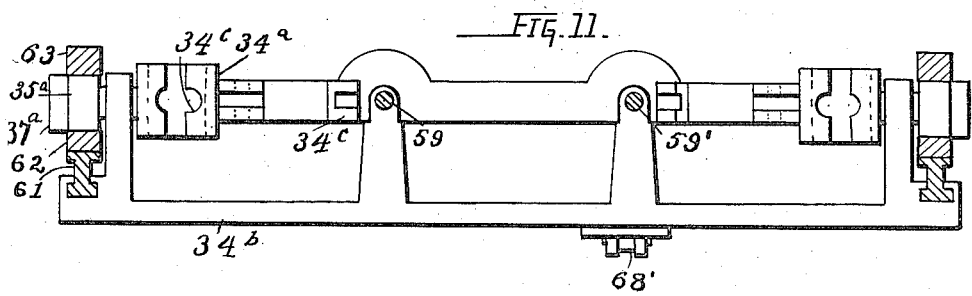

WEBSTER M. ROBERTS AND PARK D. ROBERTS, OF ST. JOSEPH, MISSOURI.

CONE-MAKING MACHINE.

1,150,625.  Specification of Letters Patent.  Patented Aug. 17, 1915.

Application filed February 15, 1915. Serial No. 8,237.

*To all whom it may concern:*

Be it known that we, WEBSTER M. ROBERTS and PARK D. ROBERTS, citizens of the United States, residing at St. Joseph, in the county of Buchanan and State of Missouri, have invented certain new and useful Improvements in Cone-Making Machines, of which the following is a specification, reference being had therein to the accompanying drawing.

Our invention relates to improvements in cone making machines, of that class which are used for baking ice cream dispensing cones; and the objects of our improvements are, first; to so construct the ovens and cores therefor, that the movement of the oven sections, for opening and closing the oven, shall be reduced to the minimum, second; to provide moving means for the cores, whereby they are so held and moved that the oven can be completely filled with batter, and also, whereby said cores are moved into such position that they may be easily and quickly cleaned of adhering cone particles, and be greased when required, third; to provide cone loosening means, whereby the baked cones are loosened from the cores and from the ovens without injuring the cones, fourth; to construct moving means, whereby the cones are removed from the ovens and to a point, distant from the machine, in the minimum amount of time, without injuring the cones, fifth; to so construct a machine of this class, that all of the above described objects are attained by automatic mechanism, driven by power.

We attain these objects by the mechanism illustrated in the accompanying drawing, in which:—

Figure 1 is a side elevation of the core moving mechanism and of one of the ovens, certain parts being broken away, to avoid obscurity and confusion. Fig. 2 is an end view of the parts seen in Fig. 1, including a portion of the endless carrier, looking toward the right, certain parts being broken away, to avoid obscurity and unnecessary extension of the drawing, and showing an oven approaching the operative position. Fig. 3 is a view, similar to Fig. 2, showing the parts in operative position, removing a cone. Fig. 4 is an enlarged end view of a pair of oven sections. Fig. 5 is an enlarged horizontal section, on the line X X, seen in Fig. 6, looking downward, showing details of the oven section moving mechanism. Fig. 6 is an enlarged view, in detail, of the oven section moving cam. Fig. 7 is an enlarged vertical section of the core bar locking mechanism, cut vertically through the center, the upper portion of the oven and of the oven carrier being broken away to avoid obscurity. Fig. 8 is a reduced top plan of a portion of the ovens and of a part of the oven carrying reel. Fig. 9 is a view, similar to Fig. 1, of one of the various other core moving and core bar locking mechanisms, which may be used. Fig. 10 is a view, similar to Fig. 9, showing the parts in position, with the core bar slightly lowered. Fig. 11 is an enlarged top plan of the core bar carrier, seen in Figs. 9 and 10. Figs. 12, 13, and 14, are enlarged top plans in detail of the core bar locking mechanism, showing the same in three different positions. Fig. 15 is a face view, in detail, of the core moving cams seen in Figs. 9 and 10.

In our preferred form of the machine, as seen in Fig. 1, the frame for the machine comprises post 1, post 2, the two posts 3, (of which but one is shown,) longitudinal rails 4 and 5, tie bar 6, tie plate 7; and tie bars 8, the latter bars being seen in Figs. 2 and 3.

The lower end of post 2 is secured to reel stand 9, on which the oven reel 10 is rotatably mounted for clockwise rotation in a horizontal plane, as seen in Fig. 8.

Oven carriers 11 have channels 11' formed therein, in which oven flanges 12' are slidably mounted. One of said flanges is formed on each end of each one of the two oven sections 12, which, together form one oven. A plurality of said ovens having their respective oven carriers secured on and evenly spaced around and on reel 10, are thus supported. Since said ovens are alike in their construction and operation, a detailed description of one oven is sufficient. Said oven has a plurality of cone shaped cavities 12″, formed therein, and since said cavities are alike in their construction and operation, but one cavity is described. The apex of said cavity opens upward and terminates in the filling aperture 13. The surface of said cavity has channels 12$^a$, formed therein of ornate form, and evenly distributed over the entire surface of said cavity, for holding cone 14 against longitudinal movement, while the cone shaped core 15 is being slightly lowered, as hereinafter described. Said oven sections 12, are each provided with a stud 16', on each end thereof. A friction roll 16 is rotatably mounted on each one of said studs, as seen in Figs. 4 and 5. Said rolls are situated in channels 17', (see Fig. 6,) formed in oven shifting cam 17, which latter is slidably mounted, for vertical movement in oven carrier 11. Said channels 17' horizontally move said rolls, for opening and closing the previously described oven. The upper portions of said channels unite and form spring chamber 17'', in which is mounted the leaf spring 18.

The free ends of said spring press said rollers toward each other, and detachably hold them in position, when said oven is closed.

The lower end of oven shifter 17 is provided with bolt 19, having head 19' formed on its lower end. Said head is slidably carried into channeled shifter rod head 20, (see Fig. 1,) formed on the upper end of shifter rod 21. The upper end portion of said rod is slidably guided in bracket 21', secured to post 1, while its lower end is similarly guided in tie bar 6. Said rod is rigidly connected with shifter rod 21'', by connector 22. Since said rods are alike in their construction and operation, and operate duplicate oven shifting mechanisms; further description of rod 21'' and its connected shifting mechanism, is unnecessary.

Connector 22 is link connected with one end of shifter lever 23, by link 23'. The central portion of said lever is oscillatably mounted on lever shaft 24, the ends of which are secured in hangers 24', secured to rails 5. The other end of lever 23 is provided with the rotatably mounted friction roll 25, said roll being projected into channel portion 26', (see Fig. 2,) formed in the face of cam 26. Said cam is secured on shaft 27, the ends of which are rotatably mounted on rails 5, and is provided with tight pulley 28 and loose pulley 28', adapted to have a shiftable belt, (not shown,) passed therearound, for releasable application of power to said cam shaft.

It will be seen in Fig. 2, that cam channel portion 26' is channel connected with channel portion 26'', the latter portion being of greater radius.

Core 15 is one of a plurality of cores, secured on core bar 29, said cores being alike in their construction and operation, a detailed description of one core is sufficient. Said core is of smaller size and of similar form to cavity 12''. The portion of said cavity that is not filled by said core, forms a mold, in which cone 14 is formed and baked, as hereinafter described.

Core bar 29 is detachably held in normal position by toggle rods 30, (see Figs. 7 and 1,) one of which supports each end of said bar. Since said rods and their operating parts are alike, but one rod and one set of said parts are described. Said rod is moved from the position seen in Fig. 1, to the position seen in Fig. 7, by the bifurcated, toggle connected toggle lever 31, which is pivotally mounted on oven carrier 11. Said toggle lever is provided with friction roll 31', rotatably mounted on the free end thereof. Said roll is moved downward when it is carried beneath cam plate 32, by the inclined under surface of said plate, for releasing the end of core bar 29, as hereinafter described. The intermediate portion of said core bar has two carrier bolts 33, secured therein, and since said bolts and their carrier engaging means are alike, but one bolt and one set of the bolt engaging parts are described. Said bolt has head 33', formed on the lower end thereof, which is slidably moved into slotted carrier rail 34, which is secured on one of the end portions of carrier tie rod 34'. Said rail is formed with one of two carrier sides 34'', on the lower end of which the central portion of hook 46 is pivotally mounted. The upper end of said hook is bifurcated, said bifurcations being passed astride bolt 33, for preventing longitudinal movement thereof, in channeled rail 34. The lower end of said hook has friction roll 47 rotatably mounted thereon, said roll being engaged by cam 48, for moving it outward. Said cam is formed on tie plate 7. Spring 49 has one of its ends connected with the lower end portion of said hook, while the other end of said spring is connected with the reversely arranged hook 46, for drawing the lower ends of said hooks toward each other, and thereby recovering their described movement.

The lower end portion of carrier side 34'' is secured on one end portion of lower tie rod 36, on one end of which the extended friction roll 37 is rotatably mounted. The upper corner of carrier frame 38 has one end of rod 34' passed loosely therethrough, for oscillatably supporting the previously described carrier. Said upper corner and the lower corner of said carrier frame are slidably mounted on vertical guide 45, secured on roll guide 42.

Since the roll guiding mechanism for guiding rolls 35 and 37 and the carrier frame and its guiding means are made in duplicate for guiding the described carrier and carrier frame at the other side of the machine, detailed description of said duplicate parts is deemed unnecessary.

Carrier frame 38 is link connected with one end of lever 39, by link 39'. The central portion of said lever is oscillatably mounted on lever shaft 24, while the opposite end of said lever is provided with friction roll 40, which projects into channel portion 41', formed in cam 41, which latter is secured on cam shaft 27. Said channel portion and channel portions 41″, 41ª and 41ᵇ, are channel connected for forming a continuous cam channel in cam 41, for moving friction roll 40, as hereinafter described. Roll guides 42 and 43 guide rolls 35 and 37 between them. Cam plate 44 is secured on the outer surfaces of said guides, and engages the extended end of roll 37, thereby guiding said roll from the position seen in Fig. 2 to the position seen in Fig. 3.

Cam plate 50 is secured on post 5 and guides roll 31′ upward, thereby recovering the previously described movement of lever 31 and of the therewith toggle connected rod 30, for locking core bar 29 in place.

Endless carrier 51, (of which only a portion is shown,) is adapted to have a plurality of cones 14 deposited thereon, and to carry said cones from the machine to a distant point, not shown.

A plurality of nozzles 52, (see Fig. 1,) are adapted to direct batter into filling apertures 13, from a batter forcing mechanism, which forms no part of this invention, and is therefore neither shown nor described.

Referring to Fig. 8, reel 10, (of which only a portion is shown,) is formed to fill a complete circle, on which a sufficient plurality of evenly spaced ovens 12, to fill the entire reel, are carried. Each one of said ovens, (except those that are adjacent to the oven filling and emptying mechanism,) is provided with a gas burner, therebeneath.

It will be understood that reel 10 is moved by steps, and stopped at the end of each step, for bringing ovens 12 successively into the position seen in Fig. 3, by reel moving mechanism, the movements of which are synchronized with the rotations of cam shaft 27; and since said reel moving mechanism forms no part of this invention, the same is neither shown nor described. It will also be understood, that during the period of time said reel and the thereon carried ovens are stopped, the latter are directly over their respective gas burners, for heating said ovens, and baking the therein carried cones.

In all of the cone making machines, of which we are aware, the cone is held against longitudinal movement in the oven, by a normally fixed shoulder, which acts as an abutment against the large annular edge of the cone. When the core of such machines is slightly moved from the oven for loosening the core from the cone, and where the adhesion of the cone to the core, is more tenacious, than the adhesion of the cone to the oven, the cone becomes loosened from the oven and is held against longitudinal movement by pressure of said large annular edge upon said shoulder, which crushes the edge portion of said cone and renders it useless. To avoid such, we have provided the channels 12ª, as previously described; by the use of which, said pressure is distributed over the entire outer surface of the cone 14.

In operation, with the parts in the position seen in Figs. 1 and 2; power is applied to pulley 28, rotating the same clockwise, which similarly rotates shaft 27 and the thereon carried cams 41 and 26. During this movement of said cams, oven 12 is moved from the position seen in Fig. 2, to the position seen in Fig. 3, at which point said oven is stopped by the previously mentioned reel moving mechanism.

This movement of the parts carries bolt head 33, (see Fig. 1,) along channeled rail 34 and also carries bolt head 19′ into rod head 20. While such is being done, roll 31′ is carried beneath cam plate 32, thereby unlocking and releasing core bar 29. Continued rotation of cam 41 brings channel portion 41″ into engagement with roll 40, thereby slightly raising said roll, which in turn slightly lowers the right end of lever 39, which by its connected parts, including bolt head 33′, slightly lowers core bar 29 and the thereon carried core 15. While channel portion 41″ is passing roll 40, said roll and the thereby actuated core bar lowering mechanism are held stationary, for a short period of time. During this period of time, roll 25 is guided from channel 26′ into channel 26″, which lowers said roll, which moves lever 23, from the position seen in Fig. 2, to the position seen in Fig. 3. This movement of said lever, raises the therewith connected parts, including plate 17, (see Figs. 6 and 5,) thereby moving oven sections 12, from the position seen in Fig. 2, to the position seen in Fig. 3, thus loosening said sections from cone 14. During this movement of said sections, core 15 prevents lateral movement of cone 14, to such an extent, that said cone can not be caused by adhesion, to follow either one of said sections.

Continued rotation of cam 26, moves channel 26″ past roll 25, thereby holding oven sections 12, in the position seen in Fig. 3. During the first half of this movement of cam 26, channel portion 41ª is moved past roll 40, which lowers core 15 from its described slightly lower position to the position seen in Fig. 3, upon which, cone 14 gravitates from said core onto endless carrier 51, which carries said cone to the previously mentioned point, distant from the machine. While said core is in this position, the same may be comfortably cleaned of adhering cone particles, or be greased for prevention of adhesion of cones 14. While such is done, the machine may be stopped, (if necessary,) by shifting the unshown belt from tight pulley 28, to loose pulley 28′, seen in Fig. 1. Continued rotation of cam 41, from the position seen in Fig. 3, moves the last half of channel portion 41ª, past roll 40, thereby returning core 15 to its described slightly lower position. At this juncture, roll 25 is guided into channel portions 26', which moves said roll upward, thereby recovering the movement of oven sections 12, bringing said sections together. Channel portion 41ᵇ, is thereafter moved past roll 40, which holds said roll in one position for another certain period of time, during which, core 15 is thereby held in its said slightly lowered position, in the described oven. During this other period of time, batter, (not shown,) is ejected from nozzle 52, through filling aperture 13, into the described oven, around core 15. Said core being in its slightly lowered position, leaves ample space in said oven for receiving the full charge of said batter; thus insuring admission therein of the same. The ejection of said batter is stopped, by the previously mentioned batter forcing mechanism, when the end of channel portion 41ᵇ has reached roll 40. The connecting channel portion which connects portion 41ᵇ with portion 41', is then moved past roll 40, which moves said roll downward, thereby upwardly moving core 15, to the limit of its upward movement. This final upward movement of said core, forces the said batter into all parts of the space between said core and said oven, thereby insuring the molding of a perfect cone 14.

It has been demonstrated, from actual practice, that residual heat in oven sections 12, causes the very small volume of batter filling aperture 13, to become partially baked and hardened, thus closing said aperture and preventing escape of batter therethrough.

Mechanism whereby the core is held in said slightly lowered position, a sufficient length of time for batter to be injected into the described oven, and whereby said core is thereafter raised to the limit of its upward movement, forms the prime element of our invention.

Channel portion 41' is moved past roll 40, thereby holding said roll and the therewith connected parts, including core 15, in the last mentioned position of said core, as seen in Figs. 1 and 2. At the same time channel portion 26' similarly passes and holds roll 25 and its connected parts, including oven sections 12. While said parts are thus held against the described oven emptying movements, the reel moving mechanism moves reel 10 one step, thereby carrying oven sections 12, from the position seen in Fig. 8, to the position of oven 12ᵇ, with oven 12ᶜ in the position of oven 12, ready to be served as previously described. During the first portion of said movement of ovens, roll 31' is carried over cam plate 50, which guides said roll upward, thereby recovering the previously described movement of lever 31, thereby detachably securing core bar 29 in the position seen in Fig. 1. During this movement of said ovens, bolt head 19 is carried from rod head 20, and during the last part of said movement, bolt head 33' is carried from channeled rail 34. At the same time, the oven section moving mechanism and the core bar moving mechanism are engaged with the parts of oven 12ᶜ. The last mentioned oven is thereafter emptied of cones and filled with batter, as previously described. The described movements are continued, in the order given, so long as the machine is in operation.

While we have shown and described the core bar locking mechanism and core bar carrying mechanism, for carrying said core bar from said oven and returning the same thereto, in the foregoing manner, it is evident that various other forms of mechanisms for performing the same offices, could be used for imparting the described movements to said core bar, without departing from the spirit of our invention, which we reserve the right to do. One of such other forms of mechanisms is illustrated in Figs. 9 to 15, inclusive, in which, core bar 29ª, (see Fig. 9,) has stud 56 secured in the center of its bottom surface. Said stud has sleeve 32ª slidably mounted thereon and supported on uprights 57', which are formed with sleeve lock 57. Said lock is rotatably mounted on the lower end portion of stud 56. Said lock has arms 57″ and 57ª formed therewith. Said sleeve has channel rails 55 formed therewith and elongated openings formed therethrough, with which the supporting uprights 57' register, when the sleeve lock, carrying the same, is rotated by stud 58, as hereinafter described.

Core bar 29ª carries pivot 30ª on which lever 31ª is pivotally and slidably mounted. The inner end of said lever is pivotally connected with sleeve 32ª. The slidably held portion of said lever has carrier bolt 33ª formed therewith. Said bolt has head 33ᵇ formed thereon, which is slid into channeled rail 34ª, which is formed with carrier 34ᵇ. Said carrier has lever guide 34ᶜ formed therewith. Said carrier has roll 35ª and extended roll 37ª rotatably mounted on one end thereof. The central portion of lever 54 is guided in said guide and one of its ends is pivotally connected with said carrier, while its opposite end has channeled rail 55 slid thereon. Said rail is formed with sleeve 32ª.

Arms 57″ and 57ª are carried into and form contact with studs 58 and 58', (see Figs. 12, 13 and 14,) for operating the core bar locking mechanism, as hereinafter described. Said studs are formed with fixed guard rail 58″, which extends in annular form beneath the entire series of ovens 12ᵈ. Since said ovens are like the previously described ovens in their construction and operation, both as to carrying and shifting mechanisms, further description of them and of their mechanisms is deemed unnecessary.

The outer end of lever 30ᵃ is inserted in an aperture in oven carrier 11ᵃ for detachably holding one end of core bar 29ᵃ, in position, as seen in Fig. 1. The other end of said core bar is provided with duplicate holding and operating mechanism, description of which is deemed unnecessary. Said duplicate parts are operated by rod 59', which is connected with rod 59, by connector 59''. The upper end of rod 59 is universally jointed to the central portion of lever 54, by universal joint 59ᵃ, the upper pivot of said joint being slidable in said lever.

The upper corners of carrier frame 60 are pivotally mounted on carrier 34ᵃ. Said frame is slidably mounted on guide rails 61, which are secured on roll guides 62, respectively, which latter, together with roll guides 63, guides rolls 35ᵃ and 37ᵃ.

Since duplicate rolls and guides are used for each side of the mechanism, a description of the parts of one side, is sufficient. Guides 62 and 63 have cam plate 64 secured thereon, for engaging the extended portion of roll 37ᵃ and guiding the same, in the same manner as the previously described roll 37.

Rod connector 59'' and the previously described core bar holding means, are actuated by cams 67, from which movement is conveyed to said connector, through the following described parts, for slightly lowering core bar 29ᵃ, from the position seen in Fig. 9, and for returning said bar, as hereinafter described.

One end of lever 65 is link connected with connector 59'', by link 65', while the intermediate portion of said lever is oscillatably mounted on shaft 24ᵃ. The other end of said lever is provided with friction roll 66, which extends into channel portion 67', formed in cam 67, seen in Fig. 15. Channel portions 67', 67'', 67ᵃ and 67ᵇ are connected to form one continuous channel, of the same construction and form as the channel portions formed in cam 41, seen in Fig. 2.

Carrier frame 60 is link connected with one end of lever 68, by link 68'. The other end of said lever is provided with friction roll 69, which extends into channel portion 70', formed in cam 70, as indicated by dotted lines. Said channel is channel connected with channel 70', forming one continuous channel in said cam. The latter channel is of such form and proportions, that roll 69 is thereby moved synchronously with the movement of roll 66, while channel portions 67'', 67ᵃ and 67ᵇ are guiding the last mentioned roll.

Nozzles 52ᵃ, (see Fig. 10,) are duplicates of nozzles 52, (see Fig. 1,) and further description of them is deemed unnecessary.

Referring to Figs. 11, and 9, carrier rail 34ᵃ has notches 34ᶜ, formed therein, which receive the sides of bolt 33ᵃ, while the same are in the position seen in Fig. 10, for preventing longitudinal movement of said bolt, when the same is tilted, as hereinafter described.

In operation, with the parts in the position seen in Figs. 9 and 11, cams 67 and 70 are rotated clockwise, by power, as previously described, in the same manner as described, oven 12ᵈ is moved into position for being emptied and filled. During said movement, bolt head 33ᵇ is carried into engagement with channeled rail 34ᵃ, and channeled rail 55 is carried into engagement with the free end of lever 54, with oven 12ᵈ directly over carrier 34ᵇ. During this movement arm 57'' is carried past stud 58, from the position seen in Fig. 12, to the position seen in Fig. 13, thereby rotating lock 57 and thereby carrying uprights 57' from beneath rails 55, in register with the previously mentioned openings. This releases core bar 29ᵃ. At this juncture, roll 66 is directed from channel portion 67' into channel portion 67'', by which movement said roll is slightly raised. This movement of said roll, by its connected parts moves the core bar 29ᵃ, from the position seen in Fig. 9, to the position seen in Fig. 10, slightly lowering said bar. Continued rotation of cam 66 brings channel portion 67ᵃ past roll 66, thereby lowering the right end of lever 65, and raising the same, and by the therewith connected lowering and raising parts, lowering said core bar 29ᵃ, from the position seen in Fig. 10, to a position similar to that of the core carrying mechanism, seen in Fig. 3, and thereafter raising said parts to the position seen in Fig. 10. While these movements are taking place, channel portion 70'' passes roll 69, thereby actuating said roll and the therewith connected lever 68, to synchronously move the carrier frame 60, downward and upward with the core bar carrying parts, as previously described. Farther rotation of cam 67, moves channel portion 67ᵇ past roll 66, which holds said roll, for a certain period of time, in one fixed position, with the parts in the position seen in Fig. 10. At the same time a portion of channel portion 70' passes roll 69 thereby holding said roll and its connected parts in the same manner, and so continues to hold said parts until the remaining part of said channel portion has passed roll 69. During said certain period of time, the sections of oven 12ᵈ are shifted together, and batter is injected therein, from nozzle 52ᵃ, in the previously described manner. After said batter is injected, the channel connection of channel portions 67ᵇ and 67' pass roll 66, thereby lowering said roll, which by its connected parts moves the core bar holding mechanism from the position seen in Fig. 10, to the position seen in Fig. 9. This movement of parts raises core bar 29ª, to the limit of its upward movement. During the period of time in which channel portion 67' is passing roll 66, oven 12ᵈ is moved in the same manner as the previously described oven 12, bringing another oven into position to be served. While oven 12ᵈ is thus being moved, the bolt head 33ᵇ is thereby carried from channeled rail 34ª. At the same time stud 56 carries bar lock 57 from the position seen in Fig. 13 to the position seen in Fig. 14, with uprights 57' in the position seen in Fig. 9, which detachably hold the parts in the position seen, after which channeled rails 55 will have been carried from the free ends of levers 54. In actual practice, it has also been found, that by holding core 15 in the described slightly lowered position, while the oven is being filled, and thereby providing a widened space between said core and oven 12ᵈ, (see Fig. 10,) the thus widened space does not become choked with the batter which is in direct contact with the surfaces of said parts, and is partially baked and thickened by residual heat radiated therefrom. This insures complete filling of the lower portion of said space, after which said core is quickly raised, and thereby forces the unthickened batter into all of the parts of said space, as previously described.

Having fully described our invention, what we claim as new, and desire to secure by Letters Patent, is:—

1. In a cone making machine, a pair of slidably mounted oven sections having therein a cavity of conical form with channels formed in the surface bounding said cavity the smaller end of said cavity being at the top and having a filling aperture therefor; a conical core in the center of said cavity with its smaller end in the top portion thereof and its larger end closing the lower end of said cavity; core operating means whereby said core is held in said cavity in a position slightly lower than normal for a predetermined length of time and is thereafter raised to said normal position.

2. In a cone making machine, a pair of slidably mounted oven sections having a cavity of conical form therein with channels formed in the surface bounding said cavity said channels being adapted to hold a baked cone against longitudinal movement; a conical core in the center of said cavity with its smaller end in the top portion thereof and its larger end closing the larger end of said cavity; core operating means whereby said core is slightly lowered from its normal position and is thereafter held in said slightly lowered position for a predetermined length of time; and oven section sliding means whereby said sections are slidably moved from each other during said period of time.

3. In a cone making machine, a pair of movably mounted oven sections confining a batter receiving space; a core in the center of said space filling the central portion thereof and closing the bottom of said space; moving means whereby said sections are moved from each other; and core moving means whereby said core is moved downward from between said sections to a point therebelow.

4. In a cone making machine, a pair of movably mounted oven sections confining a batter receiving space adapted to have a cone baked therein; a movably mounted core in the center of said space filling the central portion thereof; cone holding means formed in said sections and adapted to hold a baked cone against longitudinal movement in said space; core moving means whereby said core is moved to a position slightly lower than normal; core holding means whereby said core is held in said slightly lowered position for a predetermined length of time; section moving means whereby said oven sections are moved from each other during said period of time; core lowering means whereby said core is lowered from between said section; core tilting means whereby said core is tilted for discharging a baked cone therefrom by gravity of said cone; core returning means whereby said core is returned to said slightly lowered position; other core holding means whereby said core is held in said slightly lowered position for another certain period of time; section returning means whereby said oven sections are returned to their original position during a certain first part of said other period of time; and other core returning means whereby said core is returned to its original position after the end of said other period of time is reached.

5. In a cone making machine, a pair of movably mounted oven sections having a plurality of cone shaped batter receiving spaces formed therein with the smaller end of said spaces at the top and a filling aperture for the top of each space; a like plurality of cone shaped cores; a core bar having said plurality of cores securely mounted thereon with one of said cores in the center of each one of said spaces with the larger end portions of said cores closing the larger ends of their respective spaces; an oven carrying reel arranged to be rotated in a horizontal plane; a pair of oven carriers secured on said reel whereby the ends of said oven sections are carried; core bar holding means coacting with the ends of said core bar and with said oven carriers for detachably holding said core bar in place; and releasing means whereby said holding means is released.

6. In a cone making machine, a pair of movably mounted oven sections having a plurality of batter receiving spaces formed therein and a filling aperture for each one of said spaces; a like plurality of cores; a core bar having said plurality of cores secured thereon with one of said cores in each one of said spaces forming a plurality of molds in said spaces in which cones are formed and baked; a core bar carrier; core bar engaging means for detachably engaging said core bar with said carrier; carrier moving means whereby said carrier and the thereon carried core bar are moved from said oven sections to a point therebelow for carrying said cores and the thereon baked cones from between said oven sections to said point; cone removing means for removing said baked cones from said cores at said point; recover moving means whereby said movement of said carrier is recovered; and disengaging means whereby said core bar engaging means is disengaged.

7. In a cone making machine, a core bar adapted to have a plurality of cores secured thereon; a carrier; disengageable engaging means whereby said core bar is disengageably engaged with said carrier; guiding means whereby said carrier is guided for vertical movement thereof; tilting means whereby said carrier is tilted during the lower end portion of said movement; and moving means for moving said carrier.

8. In a cone making machine, a reel stand; a reel mounted on said stand for rotation in a horizontal plane; a plurality of pairs of oven sections slidably mounted on said reel each one of said pairs of sections forming an openable oven in which a plurality of cone shaped spaces is formed, said spaces having their smaller ends at the top and their larger lower ends open, the upper ends of said spaces terminating in filling apertures; a cone shaped core for each one of said spaces; a core bar on which said cores are secured; a core bar carrier beneath the plane in which said ovens are adapted to be carried by said reel; core bar disengageable engaging means whereby said core bar is disengageably engaged with said carrier; bar carrying means whereby said bar is carried beneath an oven into said engagement; releasing means whereby said bar carrying means is released; carrier operating means whereby said carrier is moved downward carrying the therewith engaged core bar and whereby said carrier is tilted and returned to its normal position beneath said oven; returning means for returning said bar carrying means into position for supporting said bar beneath said oven when it is still farther moved by said reel; and disengaging means whereby said core bar engaging means is disengaged by the said farther movement of said core bar.

9. In a cone making machine, a pair of movably mounted oven sections having a cone shaped cavity formed in their adjacent faces with the larger end of said cavity opening downward and a batter filling aperture connected with the apex thereof; batter directing means adapted to direct batter into said aperture; a cone shaped core in said cavity for forming an annular cone shaped space between itself and the walls of said cavity and for closing the lower end of said space; releasable holding means for normally holding said cone in said cavity; heating means for heating said oven sections and core and thereby converting said batter into a baked cone; cone loosening means whereby said cone is loosened from said core; other cone loosening means whereby said cone is loosened from the walls of said cavity and filling aperture; an endless carrier adapted to carry cones from said machine to a distant point; cone carrying means whereby the loosened cone is carried downward from said cavity; and tilting means whereby said cone carrying means is tilted to such position that said cone gravitates therefrom onto said carrier.

10. In a cone making machine, a pair of slidably mounted oven sections, having a cavity formed in their adjacent faces said cavity opening downward through said section faces; a core in said cavity extending through the bottom thereof; section sliding means whereby said sections are slid from each other; core moving means whereby said core is moved from between said oven sections to a point therebelow; core movement recovering means whereby said movement of said core is recovered; section movement recovering means whereby said movement of said oven sections is recovered; and synchronized driving means in combination with all of said moving means and movement recovering means for synchronously actuating the same.

In testimony whereof we affix our signatures in the presence of two witnesses.

WEBSTER M. ROBERTS.
PARK D. ROBERTS.

Witnesses:
 JOHN J. HINTON,
 HARRY L. YOUNG.